US008074167B2

(12) United States Patent
Kothari et al.

(10) Patent No.: US 8,074,167 B2
(45) Date of Patent: Dec. 6, 2011

(54) CROSS DOMAIN PRESENCE OF WEB USER INTERFACE AND LOGIC

(75) Inventors: Nikhil Kothari, Sammamish, WA (US); Simon Calvert, Issaquah, WA (US); Michael J. Harder, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 745 days.

(21) Appl. No.: 11/601,519

(22) Filed: Nov. 17, 2006

(65) Prior Publication Data

US 2008/0120596 A1    May 22, 2008

(51) Int. Cl.
*G06F 17/21* (2006.01)
(52) U.S. Cl. ........ 715/234; 715/255; 715/744; 715/746; 715/866
(58) Field of Classification Search ................. 715/234, 715/255, 744, 746, 866
See application file for complete search history.

(56) References Cited

U.S. PATENT DOCUMENTS

| 5,905,492 | A |   | 5/1999 | Straub et al. |
|---|---|---|---|---|
| 5,983,227 | A | * | 11/1999 | Nazem et al. ......................... 1/1 |
| 6,091,411 | A |   | 7/2000 | Straub et al. |
| 6,128,655 | A | * | 10/2000 | Fields et al. ................. 709/219 |
| 6,216,141 | B1 |   | 4/2001 | Straub et al. |
| 6,278,448 | B1 | * | 8/2001 | Brown et al. ................. 715/866 |
| 7,058,944 | B1 |   | 6/2006 | Sponheim et al. |
| 7,085,994 | B2 | * | 8/2006 | Gvily .......................... 715/234 |
| 7,356,528 | B1 | * | 4/2008 | Amer-Yahia et al. ................. 1/1 |
| 7,406,510 | B1 | * | 7/2008 | Feldman ....................... 709/217 |
| 7,406,664 | B1 |   | 7/2008 | Morton et al. |
| 7,685,160 | B2 |   | 3/2010 | Horvitz et al. |
| 2005/0267869 | A1 |   | 12/2005 | Horvitz et al. |
| 2005/0278323 | A1 |   | 12/2005 | Horvitz et al. |
| 2006/0004705 | A1 |   | 1/2006 | Horvitz et al. |
| 2007/0136201 | A1 | * | 6/2007 | Sah et al. ......................... 705/51 |
| 2007/0136320 | A1 | * | 6/2007 | Sah et al. ...................... 707/100 |
| 2010/0058167 | A1 |   | 3/2010 | Kim et al. |

OTHER PUBLICATIONS

Karger et al., Apr. 24-29, 2004, Vienna, Austria, "Haystack: A User Interface for Creating, Browsing, and Organizing Arbitrary Semistructured Information", theory.csail.mit.edu/~dguan/chi2004-demo.pdf.
Mulawa et al., "Defining Development Standards for Reusable User Interface Components", newi.ac.uk/groutv/Papers/P4.pdf.
Phanouriou Constantinos et al., Sep. 26, 2000, Blacksburg, Virginia, "UIML: A Device-Independent User Interface Markup Language", scholar.lib.vt.edu/theses/available/etd-08122000-19510051/unrestricted/PhanouriouETD.pdf.

(Continued)

*Primary Examiner* — Doug Hutton
*Assistant Examiner* — Andrew R Dyer
(74) *Attorney, Agent, or Firm* — Jared S. Goff

(57) ABSTRACT

Various technologies and techniques are disclosed that allow for repurposing content of a source web site for an external web site. The developer uses a programming feature to create a web page with a portion of content suitable for use in the form of a gadget control on an external web site. The developer sets up the portion of the web page for repurposing as the gadget control. When a request is received from the source web site to access the web page, the web page is displayed along with the displayable portion of content in the normal fashion. When a request is received from the external web site to access the portion of content in the form of the gadget control, the portion of content is provided to the external web site for use in the gadget control.

19 Claims, 10 Drawing Sheets

OTHER PUBLICATIONS

Karger et al., Vienna, Austria, "Haystack: A User Interface for Creating, Browsing, and Organizing Arbitrary Semistructured Information", http://theory.csail.mit.edu/~dquan/chi2004-demo.pdf, Apr. 24-29, 2004, pp. 1-2.

Phanouriou Constantinos et al., Blacksburg, Virginia, "UIML: A Device-Independent User Interface Markup Language", http://scholar.lib.vt.edu/theses/available/etd-08122000-19510051/unrestricted/PhanouriouETD.pdf, Sep. 26, 2000, pp. 1-159.

Mulawa et al., "Defining Development Standards for Reusable User Interface Components", http://www.newi.ac.uk/groutv/Papers/P4.pdf, Jul. 11-14, 2006, pp. 1-8.

\* cited by examiner

MortgageCalculator.aspx

350

```
<%@ page .. %>

<atlas:scriptmanager runat="server" />

<atlas:gadget runat="server" id="AcmeMortgageLenderCalculator"
        Title="Acme Mortgage Computer" Author="Acme Corp">

<contentTemplate>
        <input type="text" id="Price" /><br />
        <input type="text" id="DownPayment" />
        <span id="LoanToAmountRatio"></span><br/>
        <span id="LoanAmount"></span><br/>
        <select id="LoanPeriod">
            <option value="15">15</option>
            <option value="30">30</option>
        </select><br />
        <input type="button" value="Compute" />
        <span id="MonthlyPayment"></span>
        <script type="text/xml-script">
            <components>
                <textBox id="Price" />
                <textBox id="DownPayment" />
                <label id="LoanToAmountRatio" />
                <label id="LoanAmount" />
                <select id="LoanPeriod" />
            </components>
        </script>
    </contentTemplate>
    <scripts>
        <atlas:scriptReference runat="server" path="
~scriptsMortgageCalculator.js" />
    </scripts>
</atlas:gadget>
```

352 — <atlas:scriptmanager runat="server" />

370 ⟵  MortgageCalculator.js

```
function Compute(sender, eventArgs) {
    var dp = $object("DownPayment");
    var p = $object("Price");
    var lta = $object("LoanToAmountRatio");

var la = p - dp;
    lta.set_text((la/p)*100).toLocalString());

$object("LoanAmount").set_text(la.toLocaleString());
    var m = $object("MonthlyPayment");
    var lp = $object("LoanPeriod");

m.set_text( (la/(lp*12)).toLocalString());
}
```

CROSS DOMAIN PRESENCE OF WEB USER INTERFACE AND LOGIC

BACKGROUND

Developers writing web applications with ASP.NET or other development technologies typically create web user interface and logic (such as page handling logic like button click events and business objects) in traditional web pages and other affiliated class libraries. That web site is then hosted on a server within the company, or by an external service provider host.

It is increasingly becoming common and important to share data and functionality that enables mashup-like scenarios often found in the portals of today. Generally this has been done in two forms. The first form is to expose raw data by services for use by one or more portals in the mashup. The second form is to write data, user interface, and logic specifically as a gadget or plugin. In this latter scenario, developers create specific snippets of web functionality, like a clock user interface gadget, or a stock gadget that is registered with a particular host, such as a portal host. An end user that browses the host can then select these gadgets to build up a personalized web page at the host.

In both situations, a lot of extra effort is required if the same functionality is desired for a mashup scenario, as well as for a standard web page that is not involved in a mashup scenario. This is because the developer must write the code for the standard web page, and then separately write the code to create the gadget or service that can be used in the mashup scenario.

SUMMARY

Various technologies and techniques are disclosed that allow for repurposing content of a source web site for an external web site. The developer uses a programming feature to create a web page with a portion of content suitable for use in the form of a gadget control on an external web site. The developer sets up the portion of the web page for repurposing as the gadget control. In one implementation, a mechanism is provided to identify a portion of a page along with configurable attributes that are then used for creating the gadget. When a request is received from the source web site to access the web page, the web page is provided along with the portion of content in the normal fashion (e.g. in a non-gadget fashion). When a request is received from the external web site to access the portion of content as the gadget control, the portion of content is provided to the external web site for use in the gadget control.

This Summary was provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 4 is an exemplary source code script for one implementation illustrating the repurposing of content in the standard page as a gadget control.

FIG. 5 is an exemplary source code script for one implementation illustrating the use of an external script with the exemplary source code script shown in FIG. 4.

DETAILED DESCRIPTION

Figure 1:
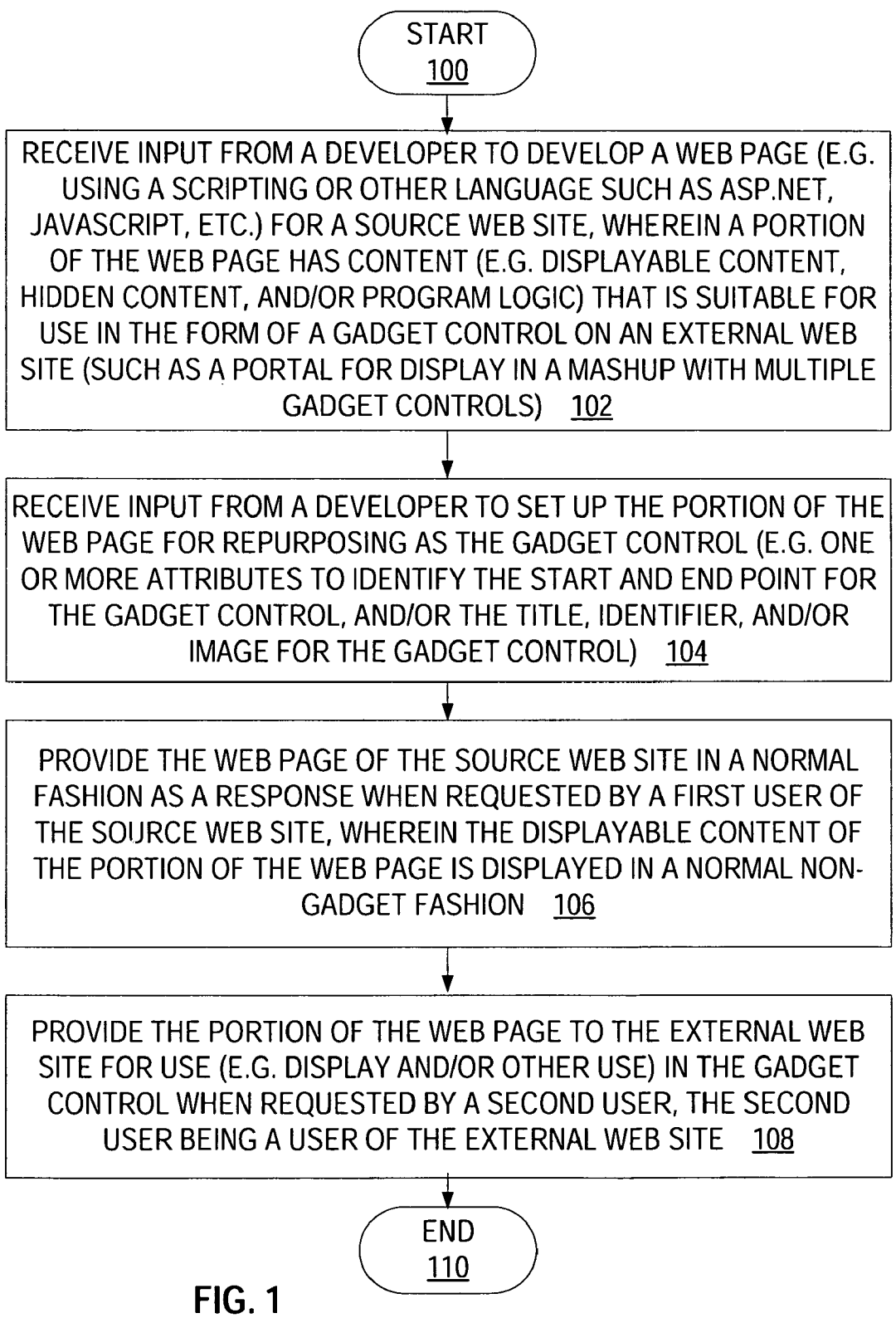
FIG. 1 is a high-level process flow diagram for one implementation.

For the purposes of promoting an understanding of the principles of the invention, reference will now be made to the embodiments illustrated in the drawings and specific language will be used to describe the same. It will nevertheless be understood that no limitation of the scope is thereby intended. Any alterations and further modifications in the described embodiments, and any further applications of the principles as described herein are contemplated as would normally occur to one skilled in the art.

The system may be described in the general context as a web development application that allows content to be developed for one or more web pages on a source web site and repurposed for use on one or more external web sites in the form of a gadget control, but the system also serves other purposes in addition to these. In one implementation, one or more of the techniques described herein can be implemented as features within a web development program or scripting language such as MICROSOFT® ASP.NET, JavaScript, or from any other type of program or service that allows a developer to create web pages. The term "content" as used herein is meant to include content that is displayed to the user, and/or program logic and/or hidden content that is used to help provide the functionality offered by the web page. The term "web page" as used herein is meant to include various types of web documents, such as HTML, ASP, ASP.NET, and/or other types of web documents that can be accessed and/or displayed in a web browser. The term "source web site" as used herein is meant to include an original web site that contains the content that is repurposed as a gadget control for an external web site. The term "external web site" means a web site that is different from the source web site. The term "gadget control" as used herein includes a separate page (user control) that allows consumption in a regular page, and/or includes pages that can be 'browsed' independently as a true gadget.

Figure 2:
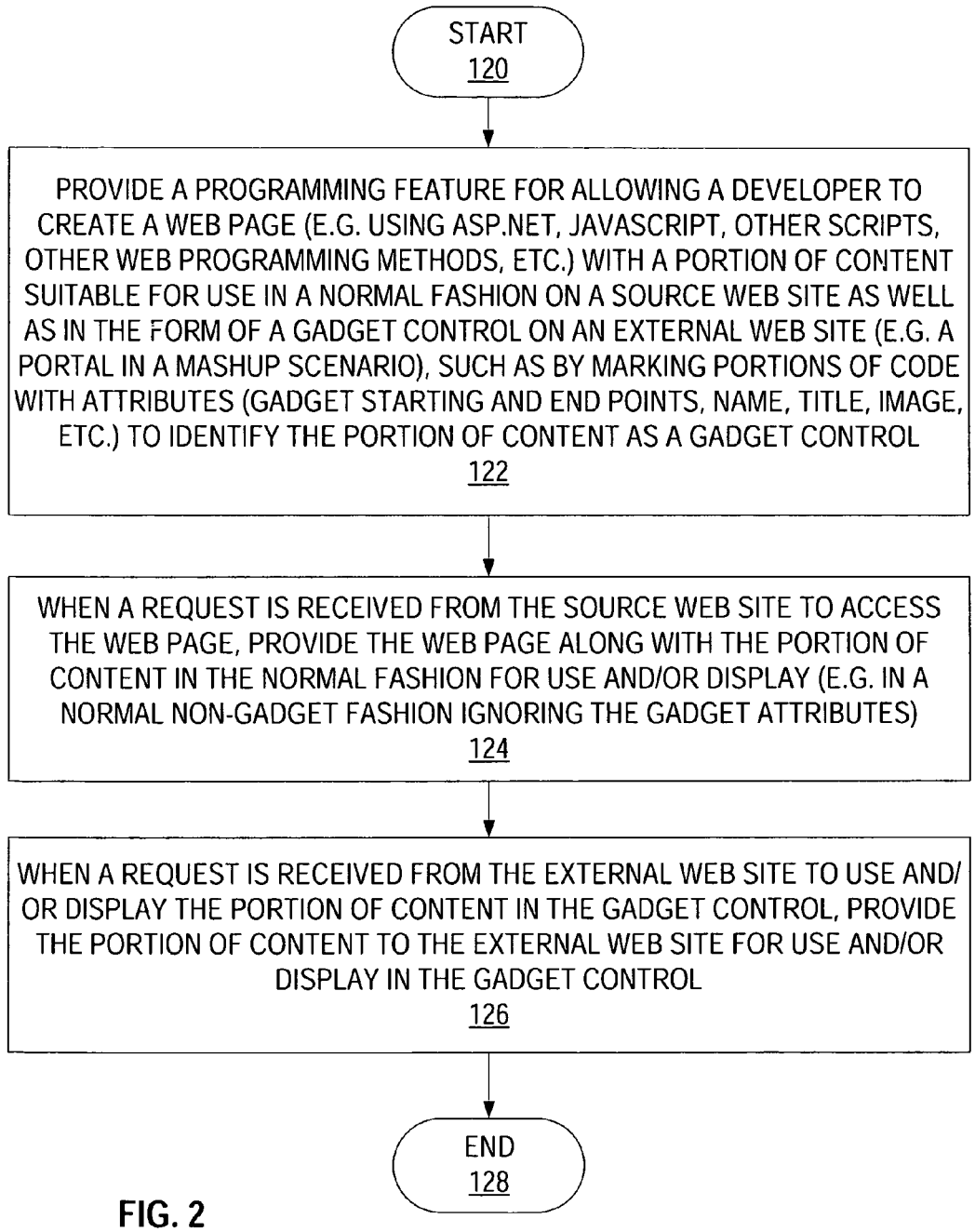
FIG. 2 is a process flow diagram for one implementation illustrating the stages involved in repurposing an existing web page to allow a portion of the content to be used as a gadget control on an external web site.
Figure 3:
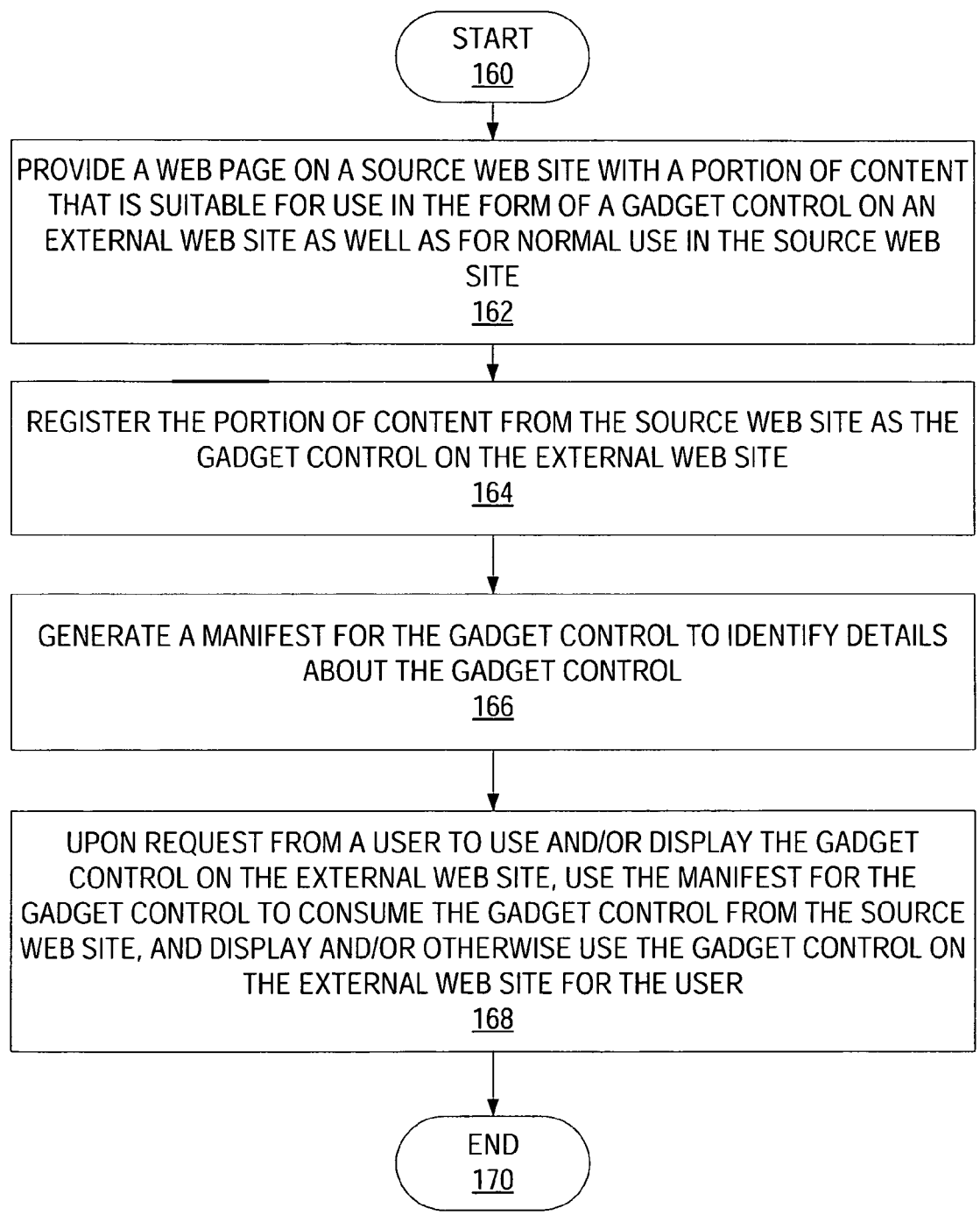
FIG. 3 is a process flow diagram for one implementation illustrating the stages involved in using a portion of content on a source web site as a gadget control on an external web site.

Turning now to FIGS. 1-3, the stages for implementing one or more implementations of the web development system are described in further detail. In one form, the process of FIG. 1 is at least partially implemented in the operating logic of computing device 600 (on FIG. 10). The procedure begins at start point 100 with receiving input from a developer to develop a web page (e.g. using a scripting or other language such as ASP.NET, JavaScript, etc.) for a source web site, wherein a portion of the web page has content (e.g. displayable content, hidden content, and/or program logic) that is suitable for use in the form of a gadget control on an external web site (such as a portal for display in a mashup with multiple gadget controls) (stage 102). The system receives input from a developer to set up the portion of the web page for repurposing as the gadget control (stage 104). In one implementation, the developer sets one or more attributes to identify the start and end point for the gadget control, and/or the title, identifier, and/or image for the gadget control (stage 104). The web page of the source web site is provided in a normal fashion in response when requested by a first user of the source web site, with a displayable portion of the web page being displayed in a normal non-gadget fashion (stage 106). The portion of the web page is provided to the external web site for use (e.g. display and/or other use) in the gadget control when requested by a second user, with the second user being a user of the external web site (stage 108). The process ends at end point 110.

FIG. 2 is a process flow diagram for one implementation illustrating the stages involved in repurposing an existing web page to allow a portion of the content to be used as a gadget control on an external web site. In one form, the process of FIG. 2 is at least partially implemented in the operating logic of computing device 600 (on FIG. 10). The procedure begins at start point 120 with providing a programming feature for allowing a developer to create a web page (e.g. using ASP-.NET, JavaScript, other scripts, other web programming methods, etc.) with a portion of content suitable for use in a normal fashion on a source web site as well as in the form of a gadget control on an external web site (stage 122). In one implementation, the developer creates the gadget control by marking portions of code with attributes (gadget starting and end points, name, title, image, etc.) to identify the portion of content as a gadget control (stage 122). In one implementation, the gadget control can be used in a portal web site in a mashup scenario with one or more other gadget controls from one or more external web sites. When a request is received from the source web site to access the web page, the web page is provided along with the portion of content in the normal fashion (e.g. in a normal non-gadget fashion ignoring the gadget attributes) for use and/or display (stage 124). When a request is received from the external web site to use and/or display the portion of content in the gadget control, the portion of content is provided to the external web site for use and/or display in the gadget control (stage 126). The process ends at end point 128.

FIG. 3 is a process flow diagram for one implementation illustrating the stages involved in using a portion of content on a source web site in the form of a gadget control on an external web site. In one form, the process of FIG. 3 is at least partially implemented in the operating logic of computing device 600 (on FIG. 10). The procedure begins at start point 160 with providing a web page on a source web site with a portion of content that is suitable for use in the form of a gadget control on an external web site as well as for normal use in a source web site (stage 162). The portion of content from the source web site is registered as the gadget control on the external web site (stage 164). A manifest is generated for the gadget control to identify details about the gadget control (stage 166). In one implementation, the manifest is auto-generated. Upon request from a user to use and/or display the gadget control on the external web site, the manifest is used for the gadget control to consume the gadget control from the source web site, and the gadget control is displayed and/or otherwise used on the external web site for the user (stage 168). The process ends at end point 170.

FIG. 4 is an exemplary source code script 350 for one implementation illustrating the repurposing of content in the standard page as a gadget control. In the example shown, a mortgage calculator ASP.NET script is displayed that is being repurposed as a gadget control. The code is wrapped with a gadget identifier at line 352, and includes additional attributes, such as Title and Author on line 354. The code for implementing the functionality (for the normal rendering of the page when ignoring the gadget attributes, or when actually rendering the gadget) is shown on lines 356. A reference to an external JavaScript is also shown, as described in further detail the code example of FIG. 5. It should be noted that while the example code 350 is only dealing with a mortgage calculator, additional features, such as other content to be displayed on the page could also be shown in the code, and then only the portion containing the gadget being wrapped with the gadget identifiers. In the interest of clarity, additional code was not shown for other features (not being repurposed as a gadget control) that could be shown on a particular web page (such as for the display of houses for sale as shown in the simulated screen of FIG. 8).

FIG. 5 is an exemplary source code script 370 for one implementation illustrating the use of an external script with the exemplary source code script shown in FIG. 4. The example shows a JavaScript piece of source code for some of the functionality of the mortgage calculator.

Figure 6:
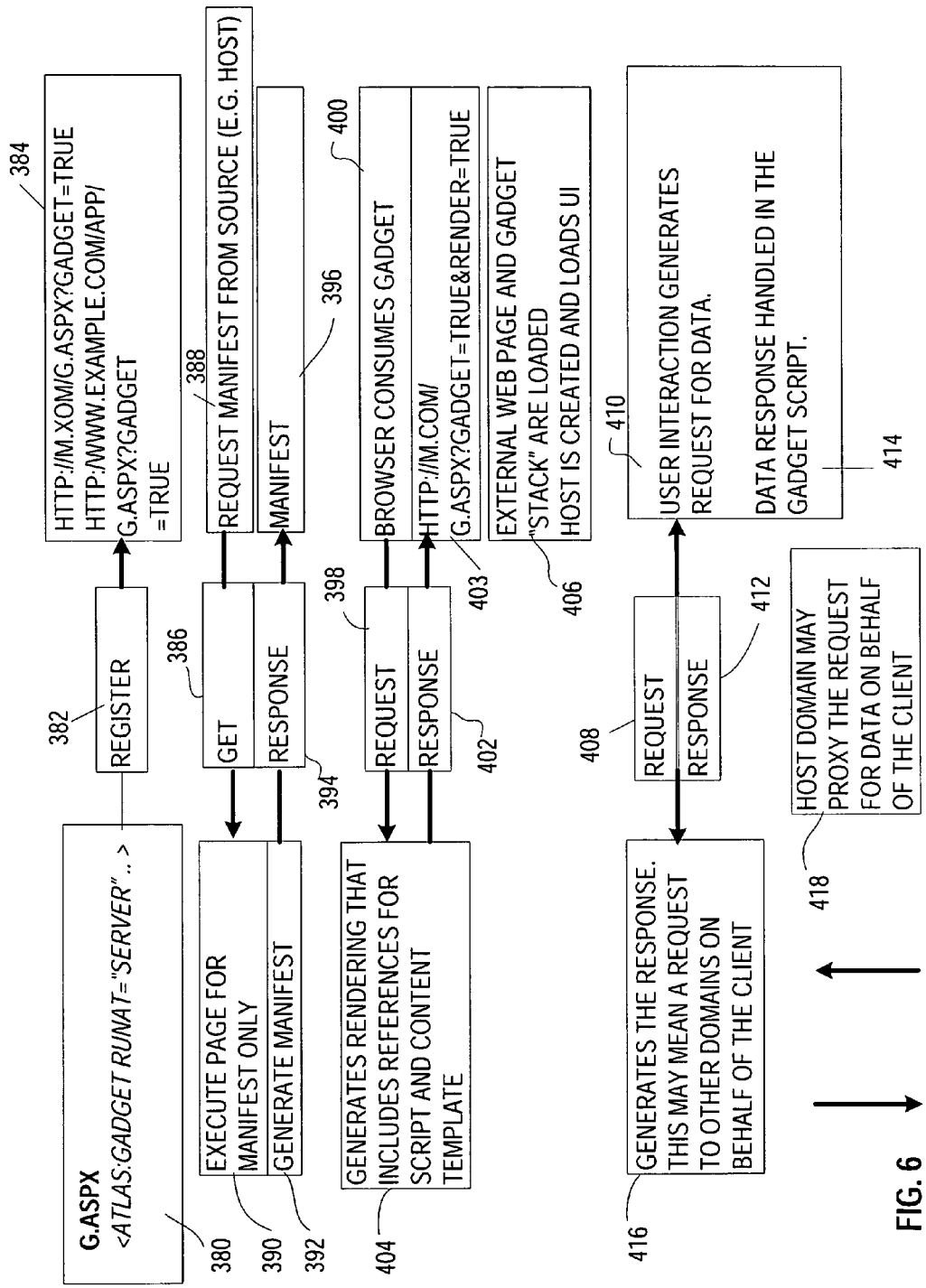
FIG. 6 is a logical diagram for one implementation that illustrates a request and response series of events that occur for registering the content on the source web page as a gadget control and later displaying the gadget control on an external web site.

FIG. 6 is a logical diagram for one implementation that illustrates an exemplary request and response series of events that occur for registering the content on the source web page as a gadget control and later displaying the gadget control on an external web site. This model shown in FIG. 6 is just one example of how request and response events could be implemented for the gadget control. One of ordinary skill in the art will appreciate that other series of events could also be used in other implementations. In one implementation, the gadget control and the framework such as the one shown in FIG. 6 provide an infrastructure to remove much of the complexity of generating information necessary to host the gadget portion in an external site.

The source web page containing the gadget control 380 is registered 382 with an external server 384. A get 386 is performed to request the manifest from the source web site 388, and the page is executed for the manifest only 390. The manifest is generated 392, and the response 394 includes the manifest 396. At a later point in time (such as when a user of the external web site or portal selects an option to access the gadget control), the browser requests 398 and consumes the gadget control 400 after the source web site responds 402 to the external web site 403 with a rendering 404 which includes references for the script and content template. The source web page and gadget stack are loaded in a manner that allows them to be controlled or scoped to themselves or the entire host. The host is created and loads the user interface for display to the user 406. As the user interacts, requests 408 for data are generated 410. The data response 412 is handled in the gadget script 414. The gadget script generates the response 416, which may mean a request to other domains on behalf of the client. The host domain may proxy the request for data on behalf of the client 418.

Figure 7:
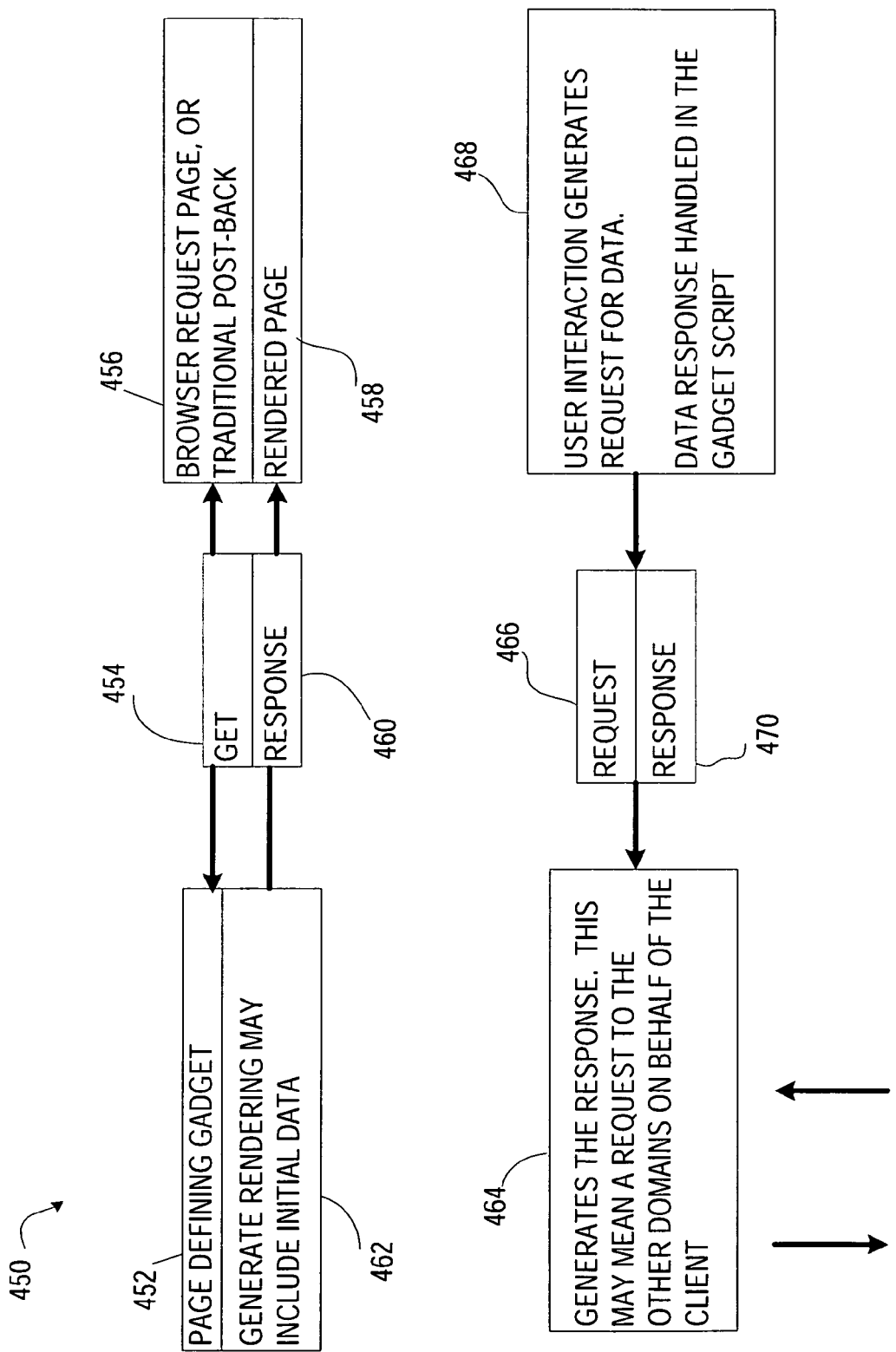
FIG. 7 is a logical diagram for one implementation that illustrates a request and response series of events that occur when the web page is requested for display on the content site.

FIG. 7 is a logical diagram 450 for one implementation that illustrates a request and response series of events that occur when the web page is requested for (normal) display on the content site. The page defining the gadget 452 performs a get 454 with the browser requesting the page or using a traditional post-back 456. The rendered page 458 is returned in response 460, and the generated rendering may include the initial data 462. User interaction then generates a request 466 for data 468, with the data response being handled in the gadget script. The response 470 is generated 464. This may mean that the external server using the gadget may potentially make requests to the source web site(s) for content or data, which are coupled together to send back to the client gadget.

Figure 8:
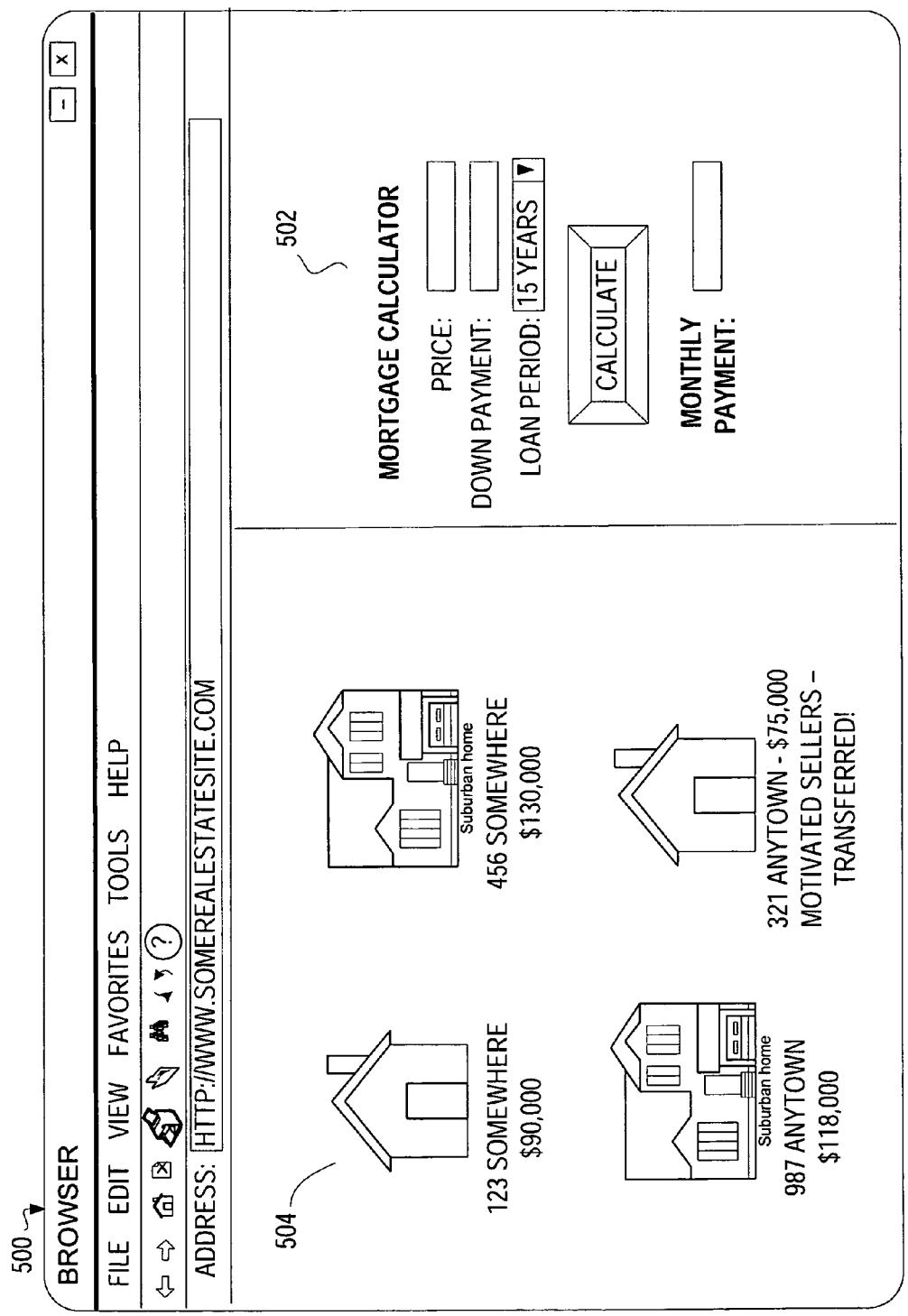
FIG. 8 is a simulated screen for one implementation that illustrates a web page displayed on a source web site with the repurposable content displayed in a normal fashion.

FIG. 8 is a simulated screen for one implementation that illustrates a web page 500 displayed on a source web site with the repurposable content 502 displayed in a normal fashion. In the example shown, the repurposable content 502 is a mortgage calculator that is shown in the normal fashion (e.g. not in a gadget control) on the screen along with the rest of the web page content 504. When this web page is displayed, the source code shown in FIGS. 4 and 5 is accessed, and the gadget attributes are ignored, allowing the page to be rendered as normal. As mentioned before, some of the source code for the web page (e.g. for displaying the houses available for sale) was not shown in FIGS. 4 and 5 for clarity.

Figure 9:
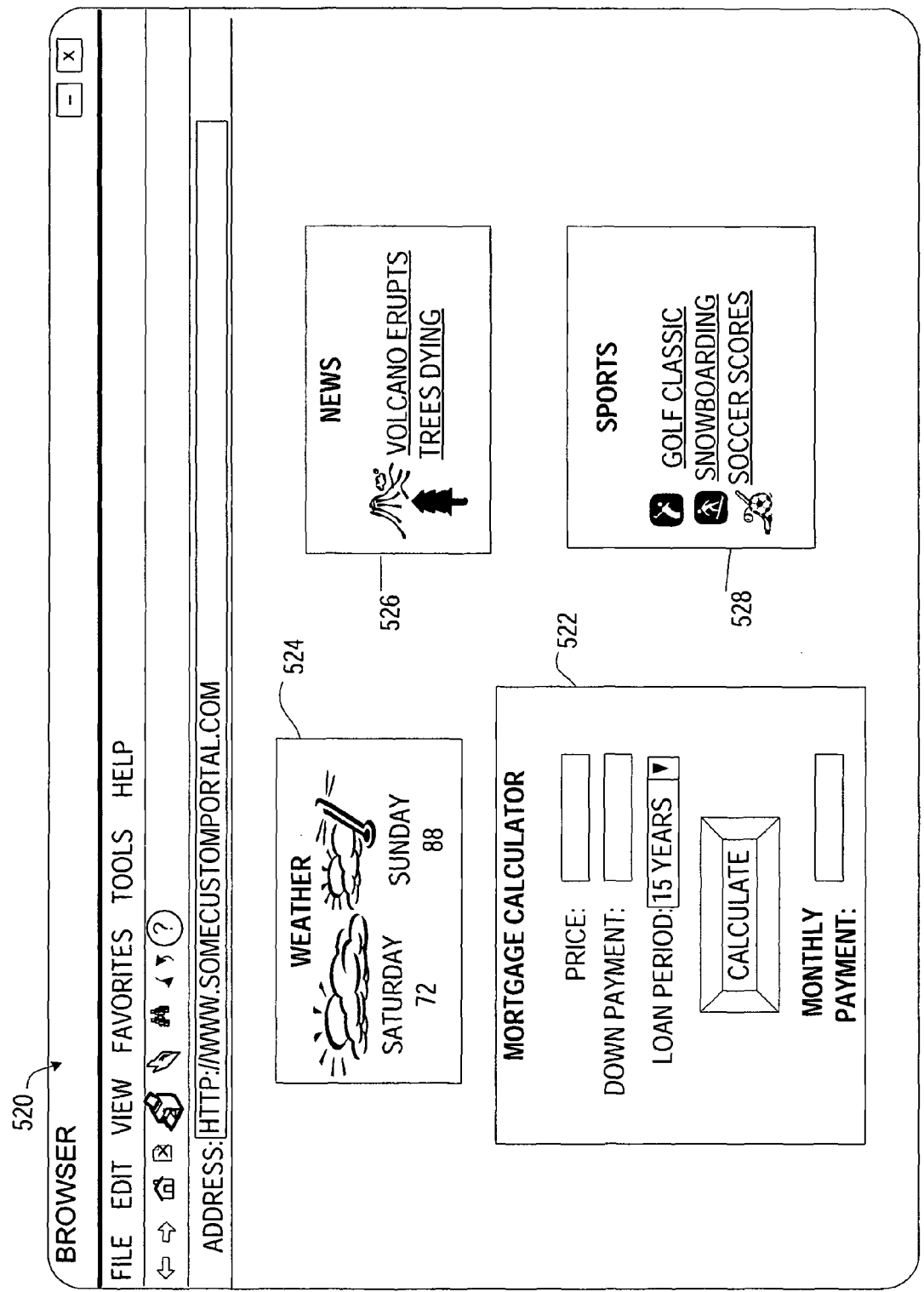
FIG. 9 is a simulated screen for one implementation that illustrates a web page displayed in on external web site with gadget controls displayed that came from various source web sites, including some content from the web page shown in FIG. 8.

FIG. 9 is a simulated screen for one implementation that illustrates a web page 520 displayed in on external web site with gadget controls displayed that came from various source web sites, including some content from the web page shown in FIG. 8. Gadget control 522 for the mortgage calculator came from the source web site as shown in FIG. 8 and described in FIGS. 1-7. Other gadget controls 526, 526, and 528 came from one or more other source web sites as well.

Figure 10:
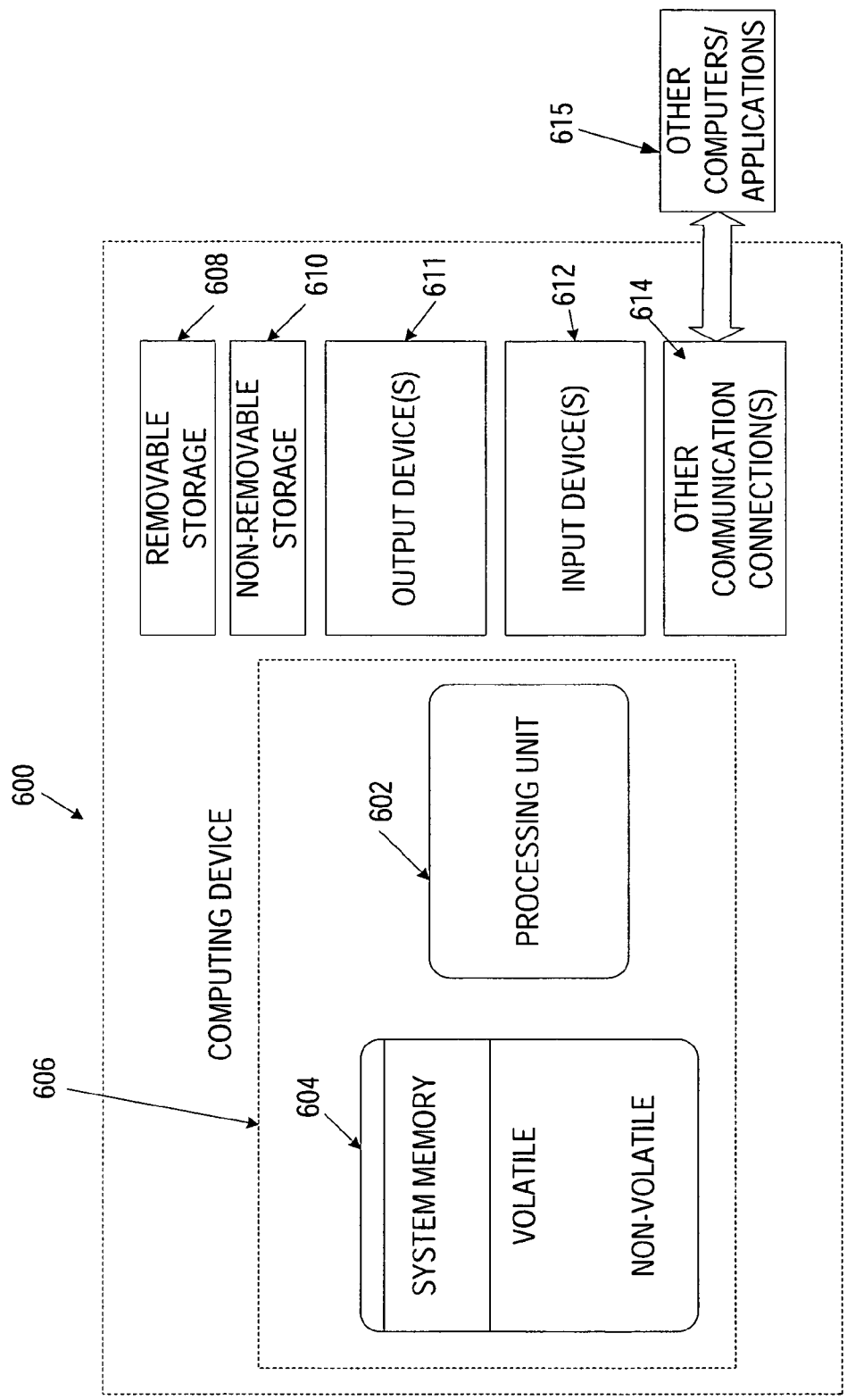
FIG. 10 is a diagrammatic view of a computer system of one implementation.

As shown in FIG. 10, an exemplary computer system to use for implementing one or more parts of the system includes a computing device, such as computing device 600. In one implementation, computing device 600 represents a server that hosts the source web site. In another implementation, computing device 600 represents a server that hosts the external web site. Alternatively or additionally, computing device 600 represents an end user computer being used to access the source web site and/or the external web site.

In its most basic configuration, computing device 600 typically includes at least one processing unit 602 and memory 604. Depending on the exact configuration and type of computing device, memory 604 may be volatile (such as RAM), non-volatile (such as ROM, flash memory, etc.) or some combination of the two. This most basic configuration is illustrated in FIG. 10 by dashed line 606.

Additionally, device 600 may also have additional features/functionality. For example, device 600 may also include additional storage (removable and/or non-removable) including, but not limited to, magnetic or optical disks or tape. Such additional storage is illustrated in FIG. 10 by removable storage 608 and non-removable storage 610. Computer storage media includes volatile and nonvolatile, removable and non-removable media implemented in any method or technology for storage of information such as computer readable instructions, data structures, program modules or other data. Memory 604, removable storage 608 and non-removable storage 610 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by device 600. Any such computer storage media may be part of device 600.

Computing device 600 includes one or more communication connections 614 that allow computing device 600 to communicate with other computers/applications 615. Device 600 may also have input device(s) 612 such as keyboard, mouse, pen, voice input device, touch input device, etc. Output device(s) 611 such as a display, speakers, printer, etc. may also be included. These devices are well known in the art and need not be discussed at length here.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. All equivalents, changes, and modifications that come within the spirit of the implementations as described herein and/or by the following claims are desired to be protected.

For example, a person of ordinary skill in the computer software art will recognize that the client and/or server arrangements, user interface screen content, and/or data layouts as described in the examples discussed herein could be organized differently on one or more computers to include fewer or additional options or features than as portrayed in the examples.

What is claimed is:

1. A computer-readable storage medium having computer-executable instructions for causing a computer to perform steps comprising:
    receiving a request from a source web site to access a web page containing a portion of content that is suitable for use in a normal fashion on the source web site or in a gadget control on an external web site, wherein the portion of content is a portion less than the entire web page, and wherein the web page includes one or more gadget attributes including at least one attribute that identifies a section of code in the web page as the portion of content to be used as the gadget control;
    in response to receiving the request, transmitting the web page containing the portion of content including the gadget attributes in the normal fashion, wherein the gadget attributes are ignored;
    receiving a request from the external web site to access the portion of content for use in the gadget control; and
    in response to receiving the request, transmitting the portion of content for use in the gadget control to the external web site according to the one or more gadget attributes, wherein the portion of content provided to the external web site comprises content from the web page.

2. The computer-readable storage medium of claim 1, wherein the one or more gadget attributes are indicated in the web page.

3. The computer-readable storage medium of claim 1, wherein the one or more gadget attributes further comprise at least one attribute to identify a title for the gadget control.

4. The computer-readable storage medium of claim 1, wherein the one or more gadget attributes further comprise at least one attribute to identify an image for the gadget control.

5. The computer-readable storage medium of claim 1, wherein the web page is created with one or more scripting languages.

6. The computer-readable storage medium of claim 1, wherein the web page references an external script, wherein the external script is not the portion of content.

7. A method for repurposing standard web content for an external web site comprising the steps of:
repurposing a portion of content contained in a web page from a purpose that is not according to one or more gadget attributes specified in the web page to a purpose as a gadget control according to the one or more gadget attributes, the portion of content being suitable for use in a normal fashion on a source web site or in a gadget control on an external web site, wherein the portion of content is a portion less than the entire web page, and wherein the gadget attributes include at least one attribute that identifies a section of code in the web page as the portion of content to be used as the gadget control;
receiving a request from the source web site to access the web page;
in response to receiving the request, transmitting the web page containing the portion of content including the gadget attributes in the normal fashion, wherein the gadget attributes are ignored;
receiving a request from the external web site to access the portion of content for use in the gadget control; and
in response to receiving the request, transmitting the portion of content for use in the gadget control to the external web site according to the one or more gadget attributes, wherein the portion of content provided to the external web site comprises content from the web page.

8. The method of claim 7, wherein repurposing the gadget control comprises including at least one attribute that identifies a section of code in the web page for the portion of the web page to be used as the gadget control.

9. The method of claim 8, wherein transmitting the web page in the normal fashion comprises ignoring the at least one attribute that identifies the gadget control and displaying displayable content of the portion of the web page in the normal fashion.

10. The method of claim 7, wherein repurposing the portion of content as the gadget control comprises:
at least one attribute to identify the gadget control, the attribute being selected from the group consisting of a title, an identifier, and an image.

11. The method of claim 7, wherein at least part of the web page is created using a scripting language.

12. The method of claim 11, wherein the scripting language is ASP.NET.

13. The method of claim 7, wherein the external web site is a portal site.

14. The method of claim 7, wherein the gadget control is one of a plurality of other gadget controls displayed in a mashup fashion on the external web site.

15. A computer-readable storage medium having computer-executable instructions for causing a computer to perform the steps recited in claim 7.

16. A method for using a portion of content on a source web site as a gadget control on an external web site comprising the steps of:
providing a web page containing a portion of content that is suitable for use in a normal fashion on a source web site or in a gadget control on an external web site, wherein the portion of content is a portion less than the entire web page, the web page including one or more gadget attributes in the web page, wherein the gadget attributes include at least one attribute that identifies a section of code in the web page as the portion of content to be used as the gadget control;
registering the portion of content from the source web site as the gadget control on the external web site, the portion of content from the source web site comprising content from the web page;
generating a manifest for the gadget control;
receiving a request from the source web site to access the web page;
in response to receiving the request, transmitting the web page containing the portion of content including the gadget attributes in the normal fashion, wherein the gadget attributes are ignored;
receiving a request from the external web site to access the portion of content for use in the gadget control; and
in response to receiving the request, using the manifest for the gadget control to consume the gadget control from the source web site, and displaying a displayable portion of the gadget control on the external web site.

17. The method of claim 16, wherein the external web site is a portal site.

18. The method of claim 16, wherein the gadget control is one of a plurality of other gadget controls displayed in a mashup fashion on the external web site.

19. A computer-readable storage medium having computer-executable instructions for causing a computer to perform the steps recited in claim 16.

* * * * *